United States Patent
Ong (10) Patent No.: US 8,650,495 B2
(45) Date of Patent: Feb. 11, 2014

(54) CAPTIVE PORTAL THAT MODIFIES CONTENT RETRIEVED FROM DESIGNATED WEB PAGE TO SPECIFY BASE DOMAIN FOR RELATIVE LINK AND SENDS TO CLIENT IN RESPONSE TO REQUEST FROM CLIENT FOR UNAUTHORIZED WEB PAGE

(75) Inventor: David Ong, Calgary (CA)

(73) Assignee: Guest Tek Interactive Entertainment Ltd., Calgary (CA)

( * ) Notice: Subject to any disclaimer, the term of this patent is extended or adjusted under 35 U.S.C. 154(b) by 144 days.

(21) Appl. No.: 13/402,198

(22) Filed: Feb. 22, 2012

(65) Prior Publication Data

US 2012/0246553 A1  Sep. 27, 2012

Related U.S. Application Data

(60) Provisional application No. 61/454,745, filed on Mar. 21, 2011.

(51) Int. Cl.
G06F 17/00 (2006.01)

(52) U.S. Cl.
USPC .......................... 715/741; 715/234; 715/742

(58) Field of Classification Search
USPC ......................................... 715/234, 741, 742
See application file for complete search history.

(56) References Cited

U.S. PATENT DOCUMENTS

| | | | |
|---|---|---|---|
| 5,309,437 A | 5/1994 | Perlman et al. | |
| 5,420,862 A | 5/1995 | Perlman | |
| 5,678,041 A | 10/1997 | Baker et al. | |
| 5,708,780 A | 1/1998 | Levergood et al. | |
| 5,761,683 A | 6/1998 | Logan et al. | |
| 5,781,550 A | 7/1998 | Templin et al. | |
| 5,802,320 A | 9/1998 | Baehr et al. | |
| 5,805,803 A | 9/1998 | Birrell et al. | |
| 5,812,776 A | 9/1998 | Gifford | |
| 5,848,233 A | 12/1998 | Radia et al. | |
| 5,901,287 A | 5/1999 | Bull et al. | |
| 5,950,195 A | 9/1999 | Stockwell et al. | |
| 5,958,015 A | 9/1999 | Dascalu | |
| 6,092,196 A | 7/2000 | Reiche | |
| 6,098,172 A | 8/2000 | Coss et al. | |
| 6,112,212 A | 8/2000 | Heitler | |
| 6,170,012 B1 | 1/2001 | Coss et al. | |

(Continued)

FOREIGN PATENT DOCUMENTS

WO 0131843 A2 5/2001
WO 0131886 A2 5/2001

*Primary Examiner* — Doug Hutton, Jr.
*Assistant Examiner* — Andrew McIntosh
(74) *Attorney, Agent, or Firm* — Andrew T. MacMillan (57) ABSTRACT

The described captive portal techniques cause client devices to render and display designated web pages. One designated web page may be different than a requested web page such as when a client is not authorized to access the requested page and is instead caused to display a login portal. The captive portal may modify the designated web page to ensure that relative links lacking base domains now have specified base domains pointing to an authorized web server. The modified content is sent from the captive portal to the client device for display. Client web browser security measures related to redirection messages are thereby bypassed and load on the captive portal is minimal. Another designated web page may be the same as the requested web page such as when the requested page is an authorized page even for non-logged in clients. Authorized pages may be modified to add a login link.

20 Claims, 9 Drawing Sheets

(56) References Cited

U.S. PATENT DOCUMENTS

| | | |
|---|---|---|
| 6,636,894 B1 | 10/2003 | Short et al. |
| 6,779,118 B1 | 8/2004 | Ikudome et al. |
| 7,020,082 B2 | 3/2006 | Bhagavath et al. |
| 7,194,554 B1 | 3/2007 | Short et al. |
| 7,689,716 B2 | 3/2010 | Short et al. |
| 7,877,783 B1 * | 1/2011 | Cline et al. ................. 726/2 |
| 8,156,246 B2 | 4/2012 | Short et al. |
| 8,244,886 B2 | 8/2012 | Short et al. |
| 8,266,266 B2 | 9/2012 | Short et al. |
| 8,266,269 B2 | 9/2012 | Short et al. |
| 8,364,806 B2 | 1/2013 | Short et al. |
| 8,370,477 B2 | 2/2013 | Short et al. |
| 2001/0044825 A1 * | 11/2001 | Barritz .......................... 709/203 |
| 2003/0114157 A1 * | 6/2003 | Spitz et al. ................... 455/435 |
| 2005/0235044 A1 * | 10/2005 | Tazuma ........................ 709/217 |
| 2007/0180147 A1 * | 8/2007 | Leigh ........................... 709/246 |
| 2011/0314149 A1 * | 12/2011 | Manning et al. .............. 709/224 |
| 2013/0055358 A1 | 2/2013 | Short et al. |

* cited by examiner

Exemplary authorized clients table

| Authorized client device address | Time remaining (in minutes) |
|---|---|
| 192.168.1.11 | 00:34 |
| 192.168.1.14 | 01:00 |
| 192.168.1.17 | 01:10 |
| 192.168.1.35 | 00:48 |
| 10.44.1.107 | 00:05 |
| 10.44.1.127 | 00:04 |
| ⋮ | ⋮ |

FIG. 4

Exemplary authorized web sites table

| Authorized web sites | IP address | Address |
|---|---|---|
| External web server | 10.26.150.104 | external.example.com |
| Internal web server | 127.0.0.1 | internal.example.com |
| Local web server | 10.1.1.1 | local.example.com |
| Banner ad hosting site | 74.125.120.120 | ads.example.com |
| Login portal | 10.2.1.1 | login.example.com |
| ⋮ | ⋮ | ⋮ |

FIG. 5

Exemplary additional content

| Advertisement link | Size |
|---|---|
| http://ads.example.com/ad45.jpg | 728x90 |
| http://ads.example.com/ad46.jpg | 468x60 |
| http://ads.example.com/ad47.jpg | 234x60 |
| http://ads.example.com/ad48.jpg | 125x125 |
| http://ads.example.com/ad49.jpg | 120x240 |
| http://ads.example.com/ad50.jpg | 12x90 |
| ⋮ | ⋮ |

Exemplary blocked content

| Blocked URLs |
|---|
| http://blocked1.example.com/* |
| http://blocked2.example.com/* |
| http://blocked3.example.com/* |
| http://blocked4.example.com/* |
| http://blocked5.example.com/* |
| http://blocked6.example.com/* |
| ⋮ |

CAPTIVE PORTAL THAT MODIFIES CONTENT RETRIEVED FROM DESIGNATED WEB PAGE TO SPECIFY BASE DOMAIN FOR RELATIVE LINK AND SENDS TO CLIENT IN RESPONSE TO REQUEST FROM CLIENT FOR UNAUTHORIZED WEB PAGE

CROSS-REFERENCE TO RELATED APPLICATIONS

This application claims the benefit of U.S. Provisional Patent Application No. 61/454,745 filed Mar. 21, 2011 which is incorporated herein by reference.

BACKGROUND OF THE INVENTION (1) Field of the Invention

The invention pertains generally to captive portals. More specifically, the invention relates to causing a web browser of a client device to display a designated web page after requesting a requested web page.

(2) Description of the Related Art

The term "captive portal" generally refers to any technique that automatically forces a client device running a web browser to display a specially designated web page before being permitted to access a network such as the Internet in a normal manner.

Captive portals are often utilized in situations where it is required to force new users to view a login portal. For example, before allowing a guest in a hotel to surf the Internet, the guest may be required to log in at the hotel's login portal for billing and/or authentication purposes. Although it is possible to simply instruct users to manually navigate to a special Uniform Resource Locator (URL) or Internet Protocol (IP) address such as by placing instructional cards or brochures near network connection ports in the hotel room, a typical hotel guest would not read these instructions and instead expect the process to be fully automatic. Rather than requiring users to type in the URL or IP address of the login portal, a more user-friendly design presents the user with the login portal regardless of what web site the user may first try to load.

Captive portals typically utilize a well-known browser redirection technique involving hypertext transfer protocol (HTTP) redirect status codes of the form 3xx. To automatically redirect a user's browser to the location of a different web site such as a login portal, the captive portal responds to an HTTP request from the client device with an HTTP response containing a status code 302 and a location field populated with the path of the login portal (e.g., path for the index.html file on the web server hosting the login portal). This HTTP response serves as a browser redirect message indicating to the browser running on the client device that the requested web page has "moved temporarily" to the specified location. In response to the browser redirect message, the web browser automatically redirects itself to the specified location and thereby loads the login portal rather than the originally requested web page.

URL redirection employing the above technique via an intermediate gateway device is described in U.S. Pat. No. 6,636,894 B1 issued Oct. 21, 2003 and entitled, "Systems and methods for redirecting users having transparent computer access to a network using a gateway device having redirection capability"; and U.S. Pat. No. 7,689,716 B2, issued Mar. 30, 2010 and entitled, "Systems and methods for providing dynamic network authorization, authentication and accounting". Both of these patent documents are incorporated herein by reference.

However, there are some disadvantages associated with the above-described browser redirection approaches. For example, sending a browser redirect message to the user's browser from an intermediate gateway causes the browser's address bar to suddenly jump from the location of the user's requested web page (e.g., URL or IP address) to another location (e.g., a different URL or IP address) that is completely unknown to the user. Some users may find this behavior alarming because it occurs automatically without their explicit permission. Furthermore, as automatic browser redirection may represent a security risk, browsers often include configurable security measures that when activated display a warning to users when an automatic redirection is attempted. For example, the Firefox™ web browser by Mozilla™ includes a user-configurable security option entitled, "Warn me when web sites try to redirect or reload the page." With this option enabled, browser redirect messages are blocked and a warning is displayed along the top of the browser window stating, "Firefox prevented this page from automatically redirecting to another page." To permit the browser redirection to take place, the user must click an "Allow" button in the upper right hand corner. Especially for risk averse and technically unskilled users, these types of browser security measures interfere with the desired functionality of automatically displaying a login portal by a captive portal.

BRIEF SUMMARY OF THE INVENTION

According to an exemplary configuration of the invention there is disclosed a method of causing a client device to display a designated web page. The method includes receiving from the client device a request for a connection to a first web server, accepting the connection with the client device by pretending to be the first web server, and receiving via the connection a hypertext transfer protocol (HTTP) request. The method further includes retrieving content of the designated web page, modifying the content to form modified content having at least some original content of the designated web page preserved, and replying to the client device via the connection with an HTTP response including the modified content.

According to another exemplary configuration of the invention there is disclosed a captive portal server. The captive portal server includes a network interface for receiving from the client device a request for a connection to a first web server. The captive portal server further includes one or more processors coupled to the network interface and configured to accept the connection with the client device by pretending to be the first web server and receive via the connection a hypertext transfer protocol (HTTP) request. The one or more processors are further configured to retrieve content of a designated web page, modify the content to form modified content having at least some original content of the designated web page preserved, and reply to the client device via the connection with an HTTP response including the modified content.

According to yet another exemplary configuration of the invention there is disclosed a captive portal including means for receiving from a client device a request for a connection to a first web server, means for accepting the connection with the client device by pretending to be the first web server, and means for receiving via the connection a hypertext transfer protocol (HTTP) request. Further included is means for retrieving content of a designated web page, means for modifying the content to form modified content having at least some original content of the designated web page preserved, and means for replying to the client device via the connection with an HTTP response including the modified content.

In an advantageous configuration of the invention, the captive portal server and method cause the client device to display the designated web page without relying on a browser redirect message.

These and other advantages of the present invention will no doubt become apparent to those of ordinary skill in the art after reading the following detailed description of the preferred embodiment that is illustrated in the various figures and drawings.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
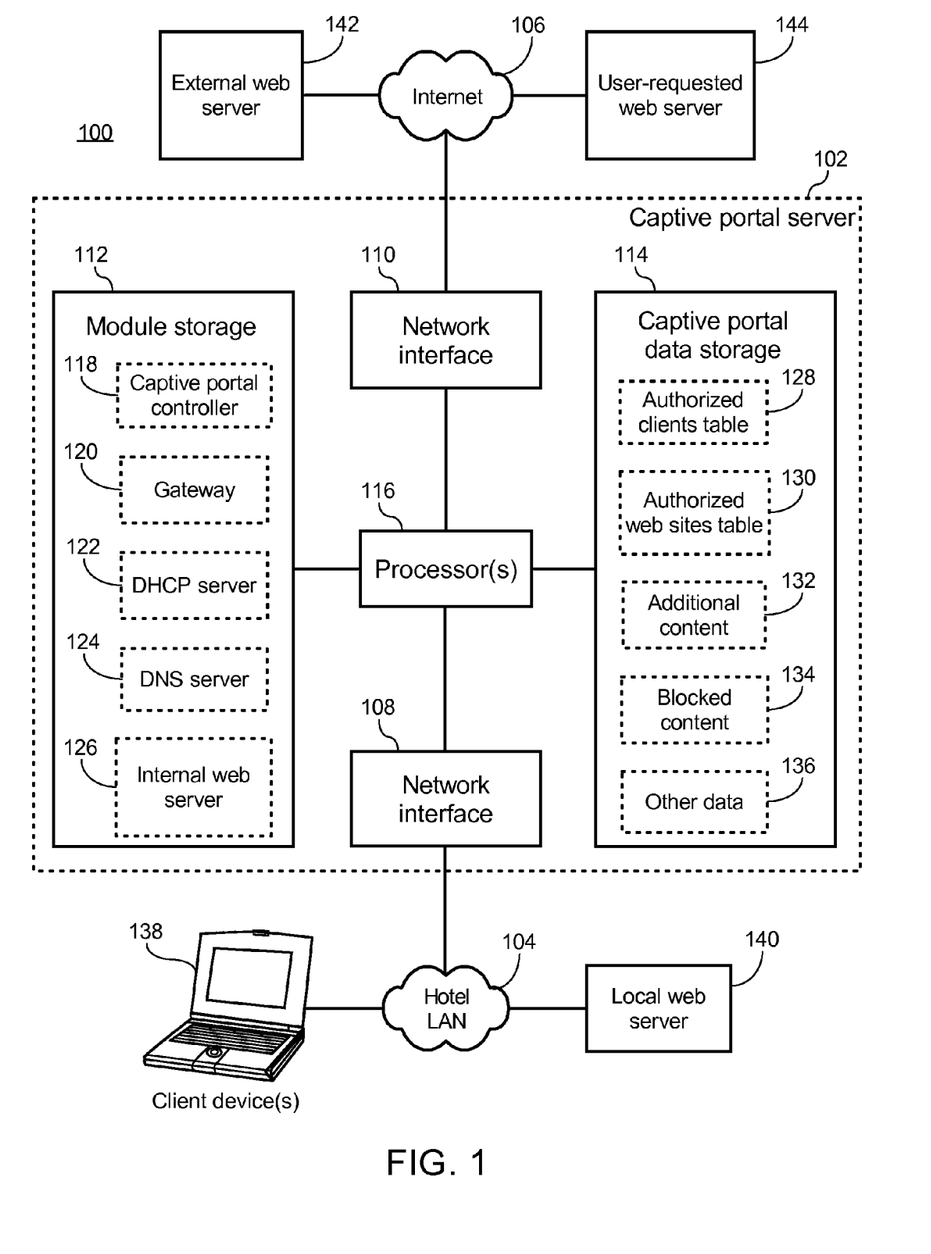
FIG. 1 shows a block diagram of a system having a captive portal server installed between a first network being a hotel local area network (LAN) and a second network being the Internet according to an exemplary configuration of the invention.

FIG. 1 shows a block diagram of a system 100 having a captive portal server 102 installed between a first network being a hotel local area network (LAN) 104 and a second network being the Internet 106 according to an exemplary configuration of the invention. In this configuration, the captive portal server 102 includes a first network interface 108 coupled to the hotel LAN 104 and a second network interface 110 coupled to the Internet 106. A module storage device 112 and a data storage device 114 are coupled to one or more processors 116, and the one or more processors 116 are in turn coupled to the first and second network interfaces 108, 110.

The module storage device 112 stores a number of software modules including a captive portal controller 118, a gateway 120, a dynamic host configuration protocol (DHCP) server 122, a domain name system (DNS) server 124, and an internal web server 126. In this configuration, the modules 118, 120, 122, 124, 126 include software instructions that when executed by the processor(s) 116 cause the processor(s) 116 to perform various functions of each module described in further detail below. The one or more processors 116 may be included in a central processor unit (CPU) of a computer server acting as the captive portal server 102. In the following description the plural form of the word "processors" will be utilized as it is common for a CPU of a computer server to have multiple processors 116 (sometimes also referred to as cores); however, it is to be understood that a single processor 116 may also be configured to perform the described functionality in other implementations.

Continuing the description of FIG. 1, the data storage device 114 stores configuration data utilized by the captive portal controller 118 including an authorized clients table 128, an authorized web sites table 130, additional content 132, and blocked content 134. Although two separate storage devices 112, 114 are shown in this example for clarity of illustration, modules and data may be stored in any number of storage devices. Additionally, although the data storage device 114 is illustrated to store configuration data utilized by the captive portal controller 118, there may additionally be other data 136 that is utilized in conjunction with any of the various modules 118, 120, 122, 124, 126.

As illustrated, a client device 138 and a local web server 140 are coupled to the hotel LAN 104, and an external web server 142 and a user-requested web server 144 are coupled to the Internet 104.

In some configurations, the captive portal server 102 acts as a typical gateway between the hotel LAN 104 and the public Internet 106 for authenticated client devices 138. For example, the captive portal server 102 may behave as the default gateway of an authenticated client device 138 pursuant to gateway module 120, which passes network traffic between the hotel LAN 104 and the Internet 106 for authorized client devices 138. However, before allowing access to the Internet 106 for an unauthenticated client device 138, the captive portal server 102 may cause the unauthenticated client device 138 to display a designated web page such as the hotel's login portal hosted on one of the internal web server 126, the local web server 140, or the external web server 142. Alternatively, unauthenticated client devices 138 may be allowed to access a number of "free" websites included within a walled garden before logging in at the login portal. In yet another configuration, unauthenticated client devices 138 may be able to access any web sites on the Internet 106 without being required to log in; however, in certain situations the captive portal server 102 may cause one or more client devices 138 to display a designated web page rather than a user-requested web page.

The purpose of the designated web page may be selected according to application-specific requirements. Examples of different designated web pages for which the invention may be employed include but are not limited to a login page, welcome page, home page, announcement page, weather page, link page, terms and conditions page, sign-up page, instruction page, billing page, warning page, etc. Different designated web pages may be utilized for different client devices 138, during different time periods, or according to different user-requested web pages, for example, and the designated web page may be dynamically selected by the captive portal server 102 or predetermined. The designated web page provided to the client device 138 is often different than the web page requested by the client device 138; however, in some situations such as those described later in this disclosure, the designated web page may in fact be the same as the requested web page.

Figure 2:
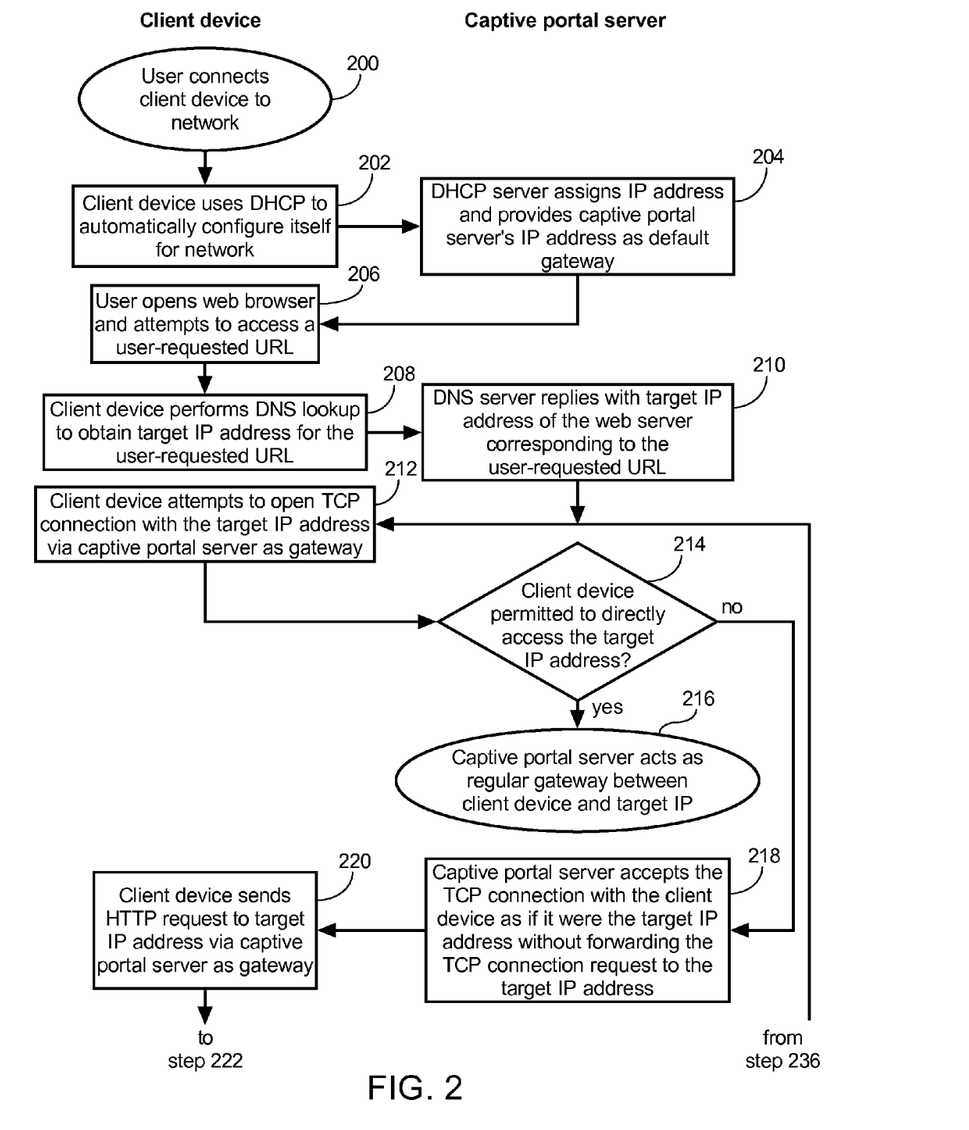
FIG. 2 and FIG. 3 in combination illustrate a flowchart describing a method of causing a client device to display a designated web page according to an exemplary configuration of the invention.
Figure 3:
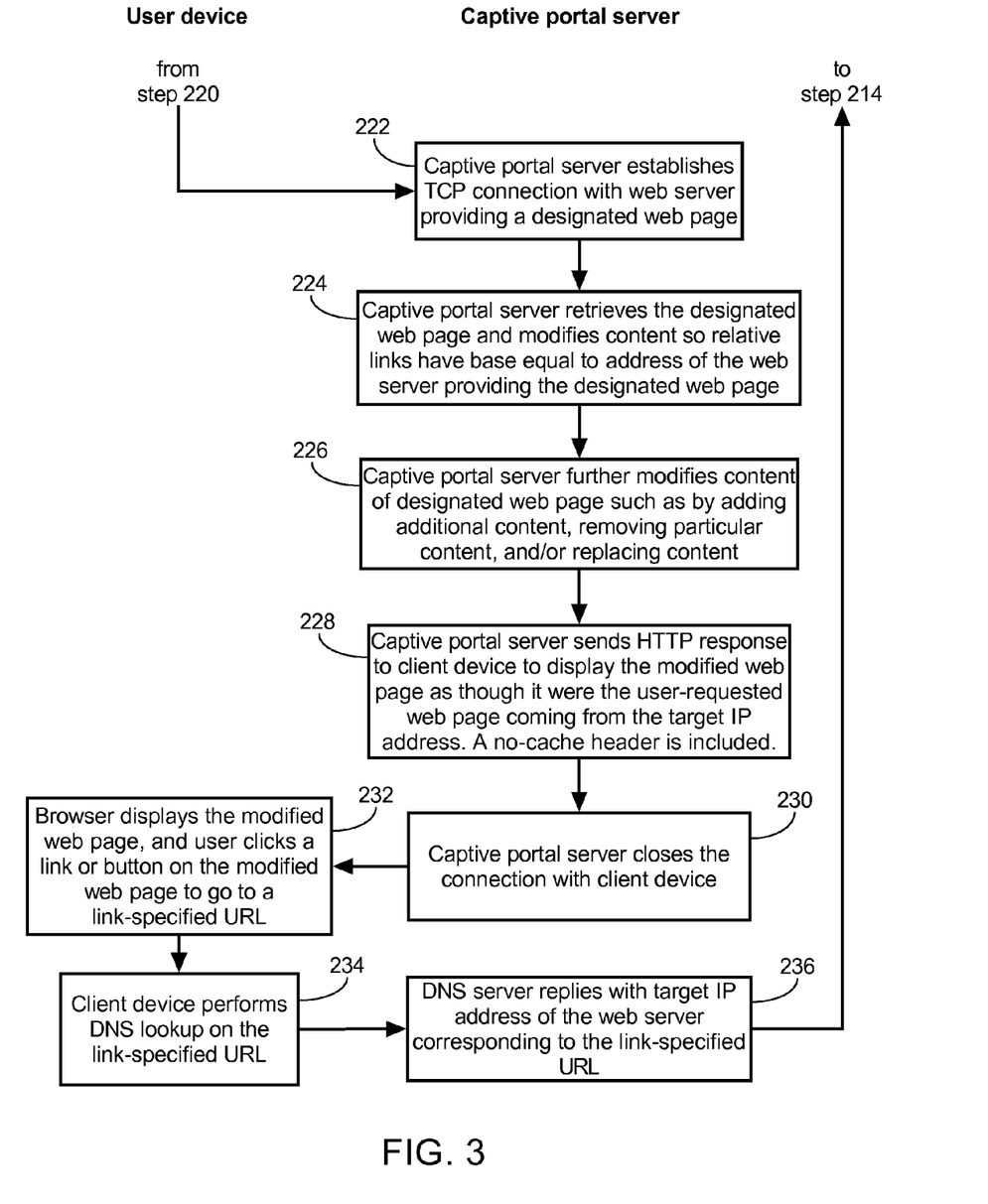

FIG. 2 and FIG. 3 in combination illustrate a flowchart describing a method of causing a client device 138 to display a designated web page according to an exemplary configuration of the invention. For purposes of illustration, the designated web page in this example is assumed to be a predetermined initial web page of a hotel's login portal. Steps performed by the client device 138 are shown in the left column and steps performed by the captive portal server 102 are shown in the right column; however, it is not a requirement that the steps must be performed by the indicated device. Additionally, the steps of the flowchart are not restricted to the exact order shown, and, in other configurations, shown steps may be omitted or other intermediate steps added.

In this configuration, the interaction between a client device 138 and the captive portal server 102 begins at step 200 when a new guest arrives at the hotel and connects a client device 138 (e.g., a laptop computer or mobile phone) to the hotel LAN 104. The connection may be a wired connection such as utilizing an Ethernet port in the guest's hotel room. In another example, the connection may be a wireless connection over a wireless network (e.g., WiFi™) provided by the hotel. Any type of wired or wireless connection may be employed.

At step 202, the client device 138 uses the dynamic host configuration protocol (DHCP) to automatically configure itself for the hotel LAN 104. DHCP is well-known in the art and involves the client device 138 sending various DHCP messages such as a "discover" and "request" in order to be assigned network settings for use on the hotel LAN 104.

At step 204, the captive portal server 102 acts as a DHCP server to dynamically assign the client device 138 an IP address to use on the hotel LAN 102 and to provide the client device 138 with the LP address of the captive portal server 102 as the default gateway. For example, this step may be performed by the one or more processors 116 executing the DHCP server 122 in the module storage device 122. Because the captive portal server 102 is set as the client device's default gateway, the client device 138 will send future IP packets having destinations off the hotel LAN 104 to the captive portal server 104.

At step 206, the user of the client device 138 opens a web browser and attempts to access the location of a user-requested web page such as http://requested.example.com.

At step 204, the captive portal server 102 acts as a DHCP server to dynamically assign the client device 138 an IP address to use on the hotel LAN 102 and to provide the client device 138 with the IP address of the captive portal server 102 as the default gateway. For example, this step may be performed by the one or more processors 116 executing the DHCP server 122 in the module storage device 122. Because the captive portal server 102 is set as the client device's default gateway, the client device 138 will send future IP packets having destinations off the hotel LAN 104 to the captive portal server 104.

At step 210, the captive portal server 102 acts as a DNS server to provide the client device 138 with the correct IP address of the web server hosting the requested web page. Typically the IP address of the web server hosting the requested web page will be off the hotel LAN 104 such as the user-requested web server 144. In another configuration, the captive portal server 102 may pretend to be the web server hosting the requested web page by providing the client device 138 with the IP address of the captive portal server in response to the DNS request. Pretending to be the user-requested web server using DNS may be useful in order to later accept a connection with the client device when the correct IP address of the web server hosting the requested web page is on the hotel LAN. The processors 116 may execute the DNS server 124 in the module storage device 122 in order to act as the DNS server in this step.

At step 212, the client device 138 attempts to open a Transmission Control Protocol (TCP) connection with a target IP address being the IP addressed received from the DNS server at step 210. Because the captive portal server 102 is set as the default gateway for the client device 138, when the target IP address corresponds to a user-requested web server 144 off the hotel LAN 104, the client device 138 sends the connection request via the captive portal server 102 as the gateway. Alternatively, when the DNS server 124 provided the IP address of the captive portal server 102 at step 210, the client device 138 sends the connection request directly to the captive portal server 102 thinking it is the web server hosting the requested web page.

At step 214, the captive portal server 102 determines whether the client device 138 is authorized to directly access the target IP address. In one configuration, authorized client devices specifically listed on the authorized clients table 128 are permitted to directly access any web server on the Internet 106, and unauthorized client devices that are not listed on the authorized clients table 128 are only permitted to directly access the authorized web servers listed on the authorized web servers table 130. The tables 128, 130 may be stored in a database and examples of their content are provided in FIG. 4 and FIG. 5, respectively.

Figure 4:
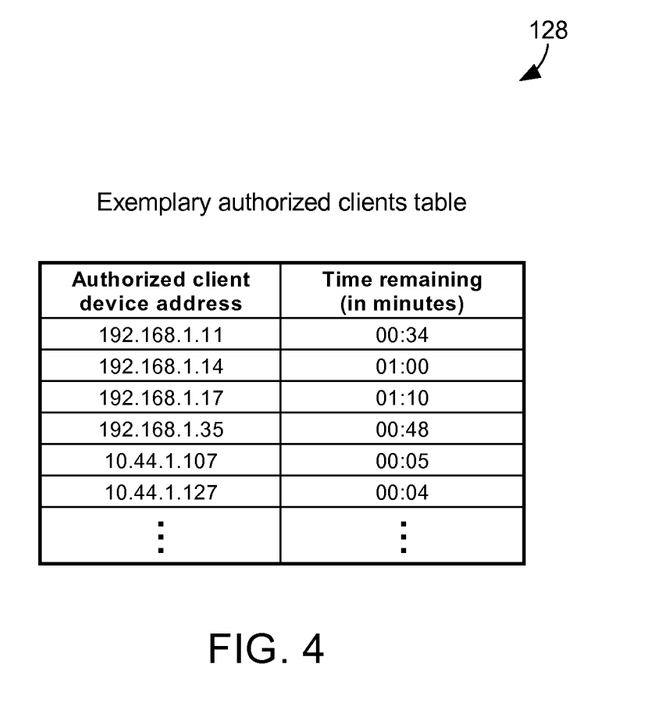
FIG. 4 illustrates an example of an authorized clients table that may be utilized by the captive portal server of FIG. 1 to determine whether a client device is authorized to access a target IP address.

FIG. 4 illustrates an example of the authorized clients table 128 that may be utilized by the processors 116 at step 214 to determine whether the client device 138 is authorized to access the target IP address. The captive portal server 102 may identify each client device 138 according to the source/destination IP address and/or MAC address of network packets transmitted from/to the client device 138. For example, packets may have a source address of a particular client device 138 or a destination address of a particular client device 138. After a user of a client device 138 has successfully logged in (i.e., after the client device 138 is authenticated), the IP/MAC address of the client device may be automatically included on the authorized clients table 128. The database storing the authorized clients table 128 may be accessible to the hotel's login portal so that it may be dynamically updated upon user log in. As shown, each client device 138 may be authorized for a particular time duration, which may be dependent upon other aspects of the log in process such as billing, etc. While a client device 138 is listed on the authorized clients table 128, that client device 138 is permitted to access all IP addresses on the Internet 106. It should also be noted that rather than storing the authorized clients table 128 within the captive portal server 102, in another configuration the authorized clients table 128 may be remotely stored on another server such as the web server providing the hotel's login portal. In this case, the captive portal server 102 may query the authorized clients table 128 on the remote server to determine whether a newly identified client device 138 is authorized to access target IP addresses on the Internet 106.

Figure 5:
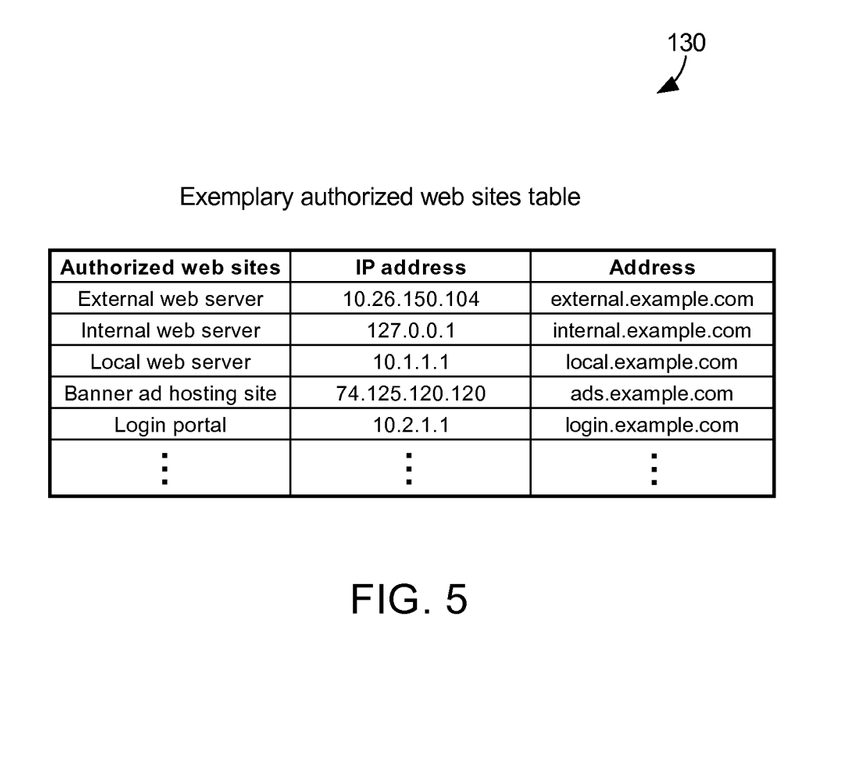
FIG. 5 illustrates an example of an authorized web sites table that may be utilized by the captive portal server of FIG. 1 to determine whether a client device is authorized to access a target IP address.
Figure 6:
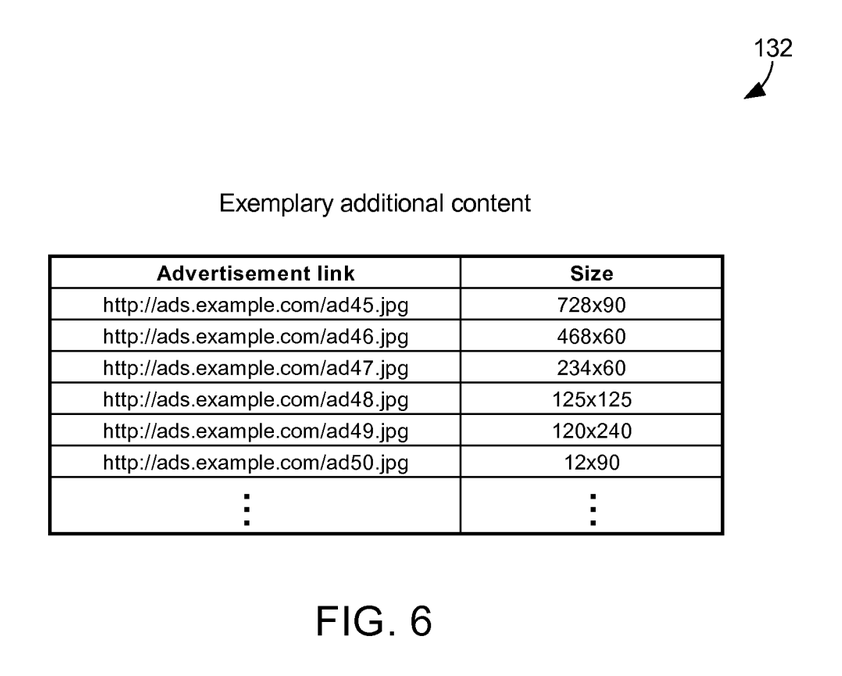
FIG. 6 illustrates exemplary additional content that may be added to the hypertext markup language (HTML) content of the designated web page by the captive portal server of FIG. 1.
Figure 7:
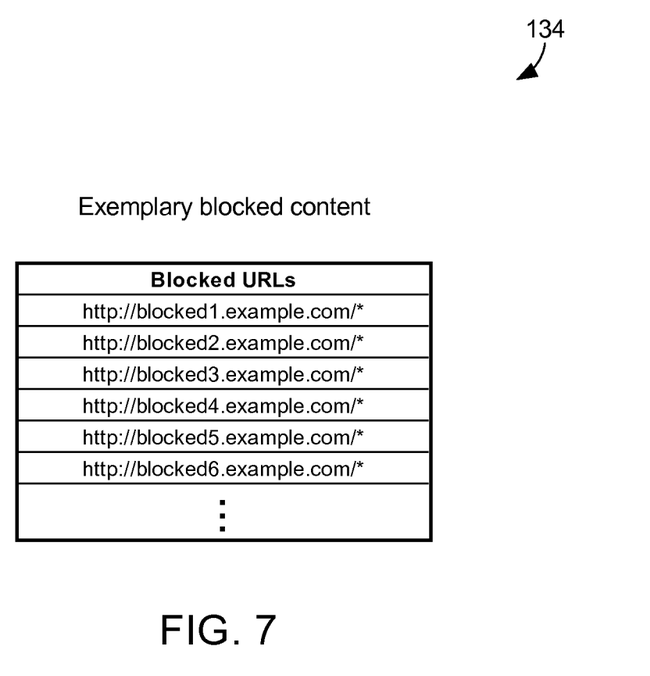
FIG. 7 illustrates exemplary blocked content that may be removed from the HTML content of the designated web page by the captive portal server of FIG. 1.

FIG. 5 illustrates an example of the authorized web sites table 130. In this configuration, when a user of a client device 138 has not yet logged in at the hotel's login portal, the address of the client device 138 is not listed on the authorized clients table 128; therefore, the captive portal server 102 only permits the client device 138 to access target IP addresses corresponding to the web servers listed on the authorized web sites table 130. The web sites listed on the authorized web sites table 130 may be predetermined "walled garden" web sites and generally remain fixed over time in one configuration. Alternatively, the captive portal server may provide a more dynamic walled garden such as that described in co-pending U.S. patent application Ser. No. 12/898,254 by the same inventor filed Oct. 5, 2010 and entitled "Walled garden system for providing access to one or more websites that incorporate content from other websites and method thereof". This co-pending patent application is incorporated herein by reference.

Continuing the description of step 214 of FIG. 2, when the client device 138 is permitted to directly access the target IP address, e.g., either because the IP address of the client device is listed on the authorized clients table 128 or the target IP address is listed on the authorized web sites table 130, control proceeds to step 216. Alternatively, when the client device 138 is not permitted to directly access the target IP address (e.g., because neither of the above two conditions are true), control proceeds to step 218.

At step 216, the captive portal server 102 acts as a typical gateway between the client device 138 and the target IP address, which allows the client device 138 and the web server corresponding to the target IP address to directly communicate with each other. Direct communication at this step means the captive portal server 102 simply acts as a typical gateway without accepting the connection with the client device 138 on behalf of the target IP address. This step may be performed by the one or more processors 116 executing the gateway 120 module in the module storage device 122.

At step 218, in the case that the captive portal server 102 is acting as the default gateway, rather than forwarding the TCP connection request to the actual target IP address, the captive portal server 102 accepts the TCP connection with the client device 138 by pretending that the captive portal server 102 is the web server corresponding to the target IP address. This may be done by the captive portal server 102 spoofing the target IP address or by temporarily assigning itself the target IP address, for example. Alternatively, when the DNS server 124 at step 210 provided the client device 138 with the IP address of the captive portal server instead of that of the web server providing the requested web page, the captive portal server 102 can continue pretending to be that web server at this step by the act of accepting the connection request.

At step 220, because the HTTP connection to the target IP address was accepted, the client device 138 assumes it is communicating with the web-server corresponding to the target IP address (e.g., the user-requested web server 144) and sends an HTTP request for a requested web page on that web server via the connection.

At step 222, the captive portal server 102 establishes its own TCP connection with the web server providing the designated web page. In this example the designated web page is predetermined as the initial page of the hotel's login portal and its URL address is stored within the other data 136 of the captive portal data storage 114. For instance, the web server providing the login portal may be an internal web server 126 running within the captive portal server 102. This configuration is particular advantageous when the hotel did not already have a login portal prior to implementing the system 100 of FIG. 1. To simplify implementation in this situation, only a single captive portal server 102 needs to be added to the hotel LAN 104. In another example, the web server providing the login portal may be a local web server 140 coupled to the hotel LAN 104. This configuration is particularly advantageous when the hotel property already had a local login portal and wishes the captive portal server 102 to automatically transfer unauthenticated client devices to the existing login portal running on the local web server 140. In another example, the web server providing the login portal may be an external web server 142 coupled to the Internet 106. This configuration is particular advantageous when several different hotel properties all use the same login portal running at a central location.

At step 220, because the TCP connection to the target IP address was accepted, the client device 138 assumes it is communicating with the web-server corresponding to the target IP address (e.g., the user-requested web server 144) and sends an HTTP request for a requested web page on that web server via the connection.

At step 222, the captive portal server 102 establishes its own TCP connection with the web server providing the designated web page. In this example the designated web page is predetermined as the initial page of the hotel's login portal and its URL address is stored within the other data 136 of the captive portal data storage 114. For instance, the web server providing the login portal may be an internal web server 126 running within the captive portal server 102. This configuration is particularly advantageous when the hotel did not already have a login portal prior to implementing the system 100 of FIG. 1. To simplify implementation in this situation, only a single captive portal server 102 needs to be added to the hotel LAN 104. In another example, the web server providing the login portal may be a local web server 140 coupled to the hotel LAN 104. This configuration is particularly advantageous when the hotel property already had a local login portal and wishes the captive portal server 102 to automatically transfer unauthenticated client devices to the existing login portal running on the local web server 140. In another example, the web server providing the login portal may be an external web server 142 coupled to the Internet 106. This configuration is particular advantageous when several different hotel properties all use the same login portal running at a central location.

At step 228, the captive portal server 102 sends to the client device 138 an HTTP response including the modified HTML content generated at steps 224 and 226 as though it were coming from the web server providing the user-requested web page. To prevent the client device 138 from incorrectly caching the modified HTML content of the designated web page sent at this step as that of the requested web page, the captive portal server 102 includes a cache-control header in the HTTP response having one or more directives set to prevent caching. Because not all browsers recognize or respond correctly to all cache-control directives, the HTTP response header may be set to include multiple cache control directives such as: "Cache-Control: no-cache, no-store, max-age-=0, must-revalidate". Other combinations of one or more cache-control directives may also be used to prevent the browser running on the client device 138 from caching the modified HTML content sent at this step.

At step 230, in a preferred configuration substantially immediately after sending the modified HTML content to the client device 138 at step 228, the captive portal server 102 closes the connection to the client device 138. To increase subsequent page load speeds from a web server, typical web browsers will hold the connection to the web server in an open state using various keep-alive techniques. The goal of holding the connection open is that future HTTP requests to the same server will not need to first open a TCP connection, thereby saving the time related to the connection setup. For example, a typical client device 138 will try to request all the images, scripts, CSS files, and other content required to display the designated web page over the same connection. However, as the captive portal server 300 is not actually the web server providing the designated web page in this example, after sending the modified HTML content of the designated web page at step 228, the captive portal server 102 deliberately closes the TCP connection with the client device 138. The client device 138 is thereby forced to open a new connection for the remaining content of the designated web page. In this way, the captive portal server 102 prevents delays and failed page loads that may otherwise be caused by the client device 138 sending later HTTP requests to the captive portal server 300 instead of the real web server providing the designated web page.

At step 232, the web browser on client device 138 renders and displays the modified HTML content of the designated web page. Continuing the example where the designated web page is the initial screen of the hotel's login portal, typically the user will click a link or button, or submit a form on the login portal, which results in the browser attempting to load a link-specified URL. As described in the description of step 224, all the relative links of the designated web page now point to the proper base domain of the web server providing the login portal. Therefore, by clicking any of these previously relative links or buttons on the login portal, the user will be manually directing their browser to go to the actual address of the web server that provides the login portal, for example, one of the internal, local, or external web servers 126, 140, 142 in different configurations. Similarly, at this step any additional content that needs to be loaded by the browser in order to render and display the login portal will be downloaded from the actual address of the web server 126, 140, 142 providing the login portal even if it was originally specified with a relative link. Any links in the login portal that were already specified as absolute links by definition include a base server domain, which could be equal to or different than the web server 126, 140, 142 providing the login portal. Therefore, the designated web page continues to operate properly on the client device 138 even though the browser's address bar indicates the address of the requested web site on a different web server such as the user-requested web server 144.

At step 234, because the user has clicked a link directing their browser to go to a new link-specified URL, the client device 138 performs a DNS lookup on the link-specified URL to determine a new target IP address.

At step 236, the captive portal server 108 acts a DNS server to provide the client device 138 with the correct IP address of the web server associated with the link-specified URL. The process then returns to step 212 where the client device attempts to open a connection to the target IP address and the captive portal server 102 checks to see if the client device 138 is permitted to access the target IP address.

An advantage of this configuration of the invention is that no automatic browser redirection to a new address is required; therefore, even if a user has setup additional security measures on their browser to warn of, block or ignore browser redirect messages, the user will still be automatically presented with the login portal when beginning their hotel Internet session. Instead of redirecting to the web server 126, 140, 142 providing the login portal, the captive portal server 102 retrieves and modifies a first screen of content from the login portal at least so that relative links point to the actual web server 126, 140, 142 providing the login portal. The original content of the login portal is otherwise preserved. The captive portal server 102 then sends this modified first screen of content to the user's browser as if it were the user-requested web page. The designated web page continues to render and display properly in the user's browser even though the browser "thinks" it is displaying the user's requested web page. Then, when the user clicks a link or button anywhere on the rendered web page, the browser is manually directed to the proper domain for the web server as specified by the link, which when continuing to a next screen of the login process will be the address of the web server 126, 140, 142 providing the login portal. In this way, the user is both automatically and "gently" transferred to the login portal without alarming the user due to their browser suddenly jumping to an unexpected web site address and without requiring the user to explicitly override a browser security warning about a web site redirection.

When the designated web page corresponds to a first screen of many content pages such as might be the case with a login portal, upon the first time the user clicks a link or button, or submits a form on the first screen of the login portal displayed at step 232, the user's browser will be directed to the correct domain and web page address for the web server 126, 140, 142 providing the login portal. Because the address of the web site 126, 140, 142 providing the login portal is included on the authorized web sites table 130 in this configuration, the captive portal server 102 may simply act as a regular gateway after the user has clicked a link. Therefore, another advantage of this configuration of the invention is that only the first page of HTML content from the login portal is retrieved and modified by the captive portal server 102; thereafter, by the user continuing the login process, the user's browser is directed to the actual address of the web server 126, 140, 142 providing the login portal as specified by the link. The above flowchart proceeds from step 214 to step 216 at this point and the captive portal server 102 acts as a regular gateway between the client device 138 and the web server providing the login portal. The load on the captive portal server 102 is thereby minimal in this configuration.

In another configuration, the address of the web server providing the designated web page is not included on the authorized web sites table 130. This configuration of the invention is particularly advantageous when the captive portal server is utilized to both cause client devices 138 to display the designated web page while at the same time continuously modifying the HTML content of the designated web page. One example of when such functionality may be useful in the context of a hospitality location such as a hotel is when the hotel requires users to log in at a login portal before granting full Internet access, but the designated web page to which the user is automatically transferred is not the hotel's login portal. For example, the designated web page may be a welcome page that allows non-logged in users to view a news portal provided by an external news agency. As the user browses the external news portal, the hotel may wish to modify the news pages to include a link to the hotel's login portal so that the user can at any time choose to log in and gain additional access. Furthermore, the hotel may wish to replace original advertisements on the news portal with new advertisements related to the hotel or local services available at or near the hotel. Other modifications may also be made as required such as blocking or replacing inappropriate content or links to material hosted off the news portal. In this configuration, rather than the designated web page provided to the client device 138 in the above flowchart being a predetermined location such as the hotel's login portal, the designated web page may be dynamically determined by the captive portal server at step 222 to be equal to the requested web page from the client device 138 for web sites needing to be modified such as an external news portal.

Concerning the modifications to the designated web page, the captive portal server 102 may beneficially add to the content of the designated web page at step 226 a link allowing users to proceed to a predetermined login portal. In this way, even though the designated web page may have nothing to do with the hotel or the login portal, when presented to the user, it will further include a link to the hotel's login portal. In a preferred configuration, the captive portal server 102 automatically adds the link to the login portal in a prominent position along the top of the modified designated web page.

Figure 8:
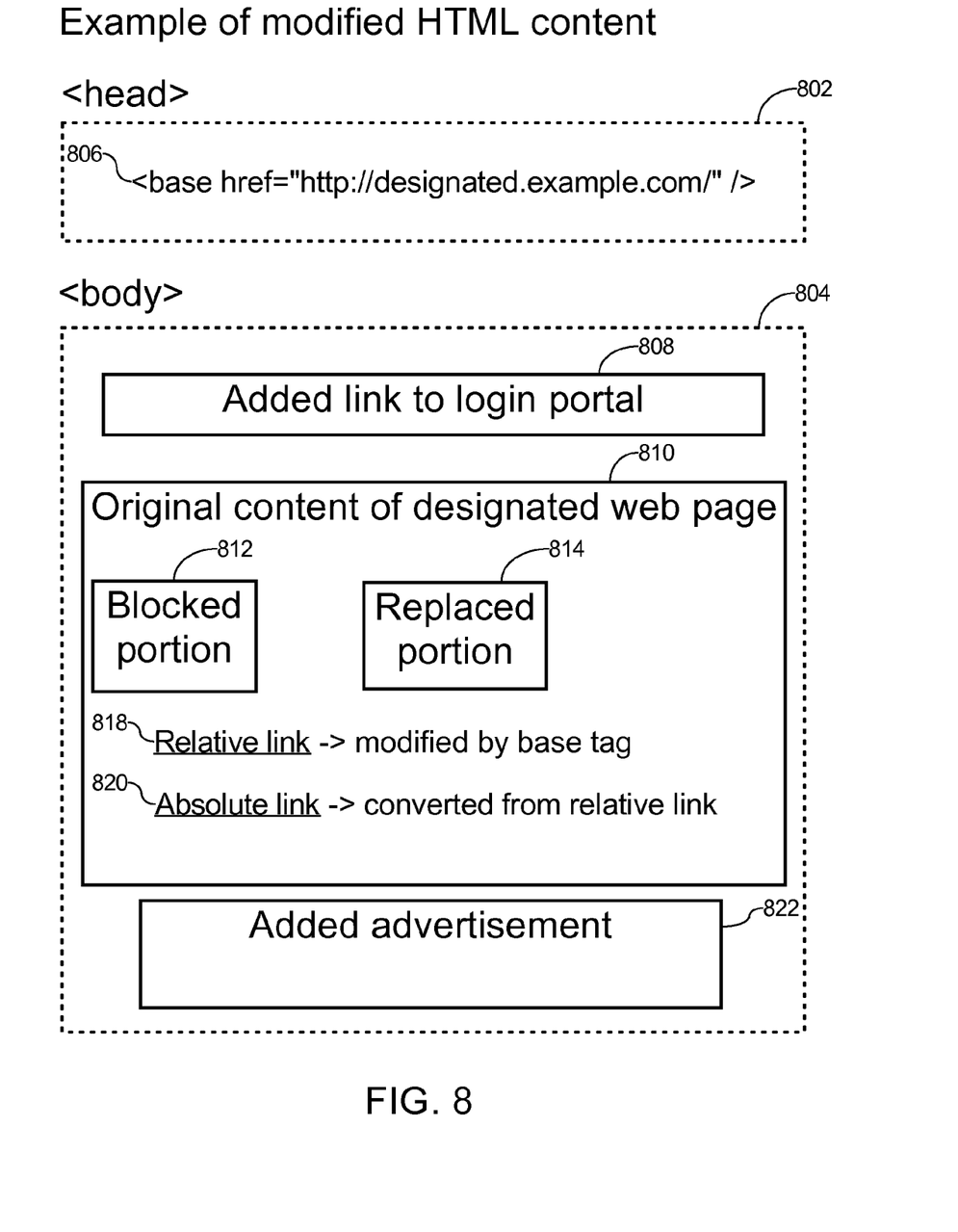
FIG. 8 illustrates an exemplary layout of modified HTML content of the designated web page that may be sent to the client device by the captive portal server of FIG. 1.

FIG. 8 illustrates an exemplary layout of the modified HTML content 800 of the designated web page that may be sent by the captive portal server 102 to the client device 138 at step 228. As illustrated, the modified HTML content 800 includes a <head> section 802 and a <body> section 804. The <head> section 802 has been modified by the captive portal server 102 to include a link base designator 806 that ensures that all relative links point to the web server providing the designated web page, e.g., http://designated.example.com in this example. The <body> section 804 has been modified by the captive portal server 102 to include an added link to the login portal 808, to remove a blocked portion 812 of the original content 810, and to replace a replaced portion 814 of the original content 810. The <body> section 804 further includes a relative link 818 that points to the web server providing the designated web page due to the link base designator 806 added to the <head> section 802 by the captive portal server 102, and an absolute link 820 that was created by the captive portal server 102 replacing a corresponding relative link in the original content 810 with an absolute link having a base domain of the web server providing the designated web page. The <body> section 804 further includes an advertisement 822 added to the bottom of the modified HTML content 800 by the captive portal server 102, and advertisement 822 links to a graphical banner ad hosted on an ad server. The rest of the original content 810 of the designated web page is preserved in its original form.

Figure 9:
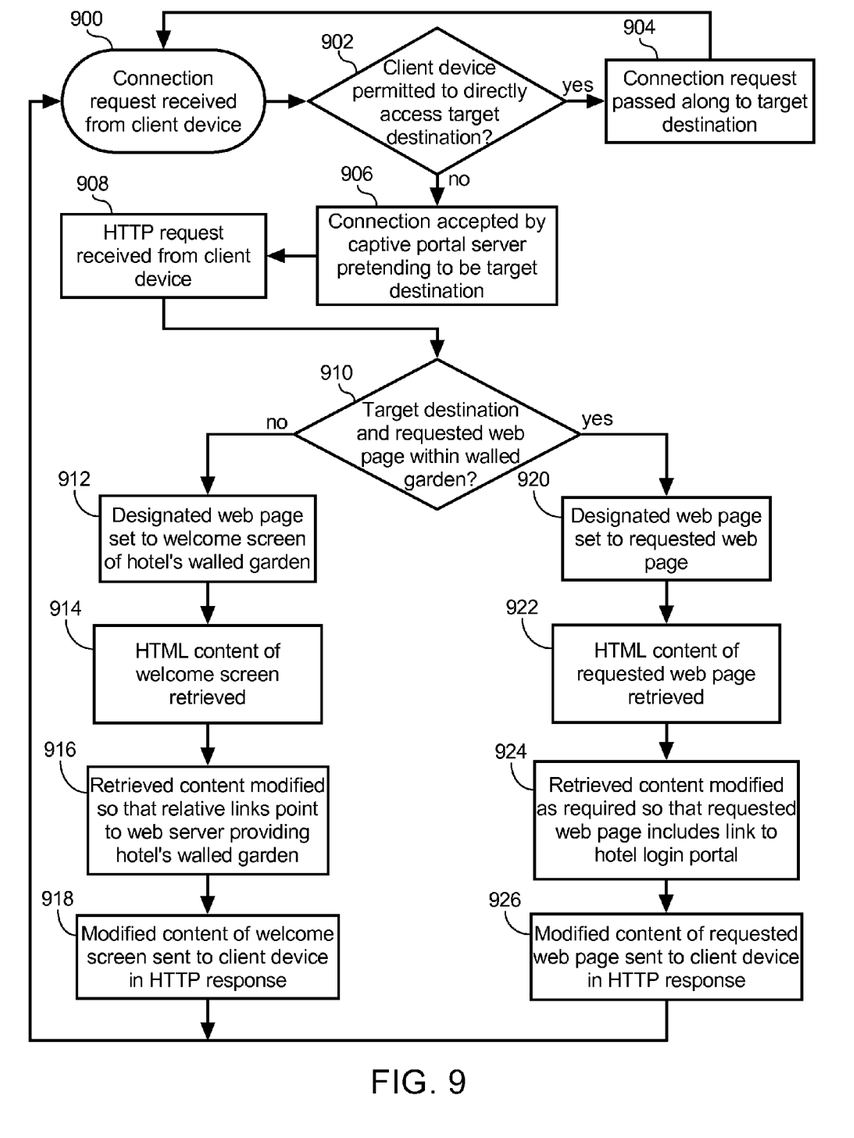
FIG. 9 illustrates a flowchart describing a method of causing a client device to display a designated web page according to another exemplary configuration of the invention.

FIG. 9 illustrates a flowchart describing a method of causing a client device to display a designated web page according to another exemplary configuration of the invention. The steps of FIG. 9 may be performed by the processors 116 of the captive portal server 102. Again, the steps of the flowchart are not restricted to the exact order shown, and, in other configurations, shown steps may be omitted or other intermediate steps added.

Following the steps of FIG. 9 in an example use case scenario, a new hotel guest may connect their laptop computer 138 to the hotel LAN 104 and attempt to access a desired web site. A connection request is then received by the captive portal server 102 at step 900. Because the user of the client device 138 has not yet logged in at the hotel's login portal, the client device 138 is determined at step 902 to not be permitted to directly access the user's desired web site. Control therefore proceeds to step 906 and the connection is accepted by the captive portal server 102 pretending to be the target destination (i.e., the user's desired web site). An HTTP request for a requested web page on the desired web site is received from the client device 138 at step 908. At step 910, the captive portal server 102 determines whether the target destination and requested web page are within the hotel's walled garden. For example, the hotel may provide a walled garden allowing unauthorized client devices 138 to access to a number of external web sites such as news, travel, stocks, weather, etc. Assuming the user's desired web site is not within the hotel's walled garden, control proceeds to step 912 in order to cause the client device 138 to display a designated web site being set equal to the hotel's walled garden welcome screen. At step 914, the HTML content of the designated web page (i.e., the welcome screen) is retrieved. At step 916, the retrieved HTML content is modified to ensure relative links points to the domain of the web server providing the designated web page (i.e., the web server providing the hotel's walled garden). At step 918, the modified content of the welcome screen is sent to the client device 138 and the connection is immediately closed by the captive portal server 102. In this configuration, unauthenticated client devices 138 are permitted to directly access the hotel's walled garden welcome screen; therefore, subsequent connection requests to load remaining content for the walled garden welcome screen received at step 900 will cause the flowchart to proceed to step 904.

Assuming the user then decides to browse one of the external websites within the walled garden as linked to from the welcome screen, upon receiving a corresponding connection request from the client device 138 at step 900 for an external web page, control will eventually proceed to step 920 because the external web page is within the hotel's walled garden. At step 920, the designated web page is set equal to the requested web site (i.e., the external web page). At step 922, the HTML content of the designated web page (i.e., equal to the requested web page) is retrieved. At step 924, the retrieved content is modified as required to add a link to the hotel login portal to the retrieved content. Further modifications may also be made at this step such as adding, removing, or replacing particular content such as advertisements. At step 926, the modified content is sent to the client device 138. Because unauthenticated client devices 138 are not permitted to directly access external web pages within the walled garden, the remaining connection requests to load content from external web page received at 900 will be proxied through the captive portal server 102 in a similar way. However, only the main page HTML content needs to be modified at step 924 to add the link to the hotel login portal; other parts of the content may simply be proxied directly without further modification in this configuration. Alternatively, other parts of the content may be modified such as replacing advertisements with new advertisements.

When the user eventually decides to click one of the links to the login portal (e.g., either as already provided on the hotel's welcome screen or added by the captive portal server 102 to the content of an external web page within the hotel's walled garden), the client device 138 will attempt to connect to the web server providing the hotel's login portal. In this example, all client devices 138 are permitted to directly access the hotel's login portal at step 902 so control will proceed to step 904. After completing the login process, the login portal may authorize the client device 138 to access all web sites on the Internet 106 for a specific time duration by adding the client device's IP address to the authorized device table 128. From this point on until expiry of the allocated time duration, any connection request received from this client device 138 will be permitted to directly access the target destination by the captive portal server at steps 902, 904 in the above flowchart.

Although the invention has been described in connection with preferred embodiments, it should be understood that various modifications, additions and alterations may be made to the invention by one skilled in the art without departing from the spirit and scope of the invention as defined in the appended claims. For example, in another configuration of the invention, one or more of the gateway 120, DHCP server 122, and/or DNS server 124 of FIG. 1 may be located external to the captive portal server 102.

In another example, the captive portal server 102 may pretend to be the user-requested website by utilizing the DNS server 124 (located either internal or external to the captive portal server 102). In this configuration, the DNS server 124 provides the client device 138 with the IP address of the captive portal server 102 instead of the IP address of the user-requested web server 144. According to this configuration or the invention, the captive portal server 102 simply accepts the connection at step 218 of the above flowchart and follows the rest of the process as outlined above. A benefit of this configuration is that it is compatible with some existing captive portal implementations that may already have such DNS functionality.

In another example, the gateway 120 of FIG. 1 may be located external to the captive portal server 102 and may operate to transparently forward the connection request by client device 138 to the captive portal server 102. According to this configuration of the invention, instead of acting as a redirection server and sending a browser redirection message to the proper path of the login portal, the captive portal server 102 simply accepts the connection at step 218 of the above flowchart and follows the rest of the process as outlined above. A benefit of this configuration is that it is compatible with some existing captive portal implementations that already have an external gateway with this functionality.

In another example, the captive portal server 102 may pretend to be the user-requested website by utilizing the DNS server 124 (located either internal or external to the captive portal server 102). In this configuration, the DNS server 124 provides the client device 138 with the IP address of the captive portal server 102 instead of the IP address of the user-requested web server 144. According to this configuration of the invention, the captive portal server 102 simply accepts the connection at step 218 of the above flowchart and follows the rest of the process as outlined above. A benefit of this configuration is that it is compatible with some existing captive portal implementations that may already have such DNS functionality.

In another example, rather than (or in addition to) closing the connection with the client device 138 at step 230, the captive portal server 102 includes at step 230 a connection header in the HTTP response having one or more directives set to prevent the browser on the client device 138 from holding the connection open after receiving the HTTP response. For example, the captive portal server 102 may include an HTTP response header such as: "Connection: close", which indicates to the client device 138 that the connection is not a persistent connection and should therefore be closed after receiving the HTTP response. Either or both of including a connection header at step 228 and/or closing the connection at step 230 may be employed by the captive portal server 102 to cause the connection with the client device 138 to be closed after replying to the client device with the HTTP response and before a subsequent HTTP request is received from the client device over the same connection.

In another example, the HTTP request sent by the client device 138 at step 220 and received by the captive portal server 102 at step 222 may be a secure HTTP request. The process may continue in a similar manner as to previously described and the captive portal server 102 sends a secure HTTP response to the client device 138 at step 228. In this configuration, because the captive portal server 102 may not have the appropriate encryption certificate for the web site at the target IP address, the user's browser may display a warning to the user before displaying the modified web page at step 232. Although this warning is undesirable, this configuration of the present invention still eliminates the browser warning for the automatic redirection as would occur when employing a browser redirect message (e.g., HTTP status code 3XX). Therefore, this configuration of the invention beneficially reduces the potential browser warnings from two to one.

In the above description, the word "guest" actually means current guests in the hotel, people who are attending a conference or meeting in the hotel, staff members at the hotel, or any other user who may need or want to utilize a hotel media system. Future guests that have reservations, potential future guests that don't yet have reservations, and other users may also have their client devices 138 caused to display a designated web page. For example, a demonstration of the technology may be available in the hotel lobby and all users would be able to use the system 100.

Although the invention has been described as being utilized at a hotel for illustration purposes, the present invention is equally applicable to any hospitality related location or service wishing to cause users to display a designated web page including but not limited to hotels, motels, resorts, hospitals, apartment/townhouse complexes, restaurants, retirement centers, cruise ships, busses, airlines, airports, shopping centers, passenger trains, libraries, coffee shops, hotspots, etc. Additionally, the invention is applicable to situations where a captive portal is required including other typical home and corporate usages in addition to the above described hospitality examples.

In an exemplary configuration, a captive portal server causes a client device to display a designated web page such as a predetermined first screen of a login portal. The captive portal receives from the client device a request for a connection to a first web server, which may be any user-requested web server on the Internet for example. The captive portal server accepts the connection with the client device by pretending to be the first web server and receives via the connection a hypertext transfer protocol (HTTP) request for a requested web page of the first web server. The captive portal server retrieves content of the designated web page from a second web server being different than the first web server, and modifies the retrieved content of the designated web page at least to ensure relative links point to the second web server. The captive portal server then replies to the client device via the connection with an HTTP response including the modified content of the designated web page. The client device renders and displays the modified content of the designated web page as the requested web page, and when a user clicks on link on the modified content such as by proceeding to a next portion of a log in process, the client device's browser attempts to establish a connection with the web server providing the link-specified location. Because the captive portal server modified the retrieved content of the designated web page at least to ensure relative links point to the second web server, the designated web page continues to operate properly even though the browser's address bar indicates the requested web site on the first web server.

The various separate configurations, elements, features, and modules of the invention described above may be integrated or combined. The modules may be executed by one or more processors 116 operating pursuant to instructions stored on a tangible computer-readable medium such as module storage device 112 to perform the above-described functions of any or all aspects of the captive portal server 102. Examples of the tangible computer-readable medium include optical media (e.g., CD-ROM, DVD discs), magnetic media (e.g., hard drives, diskettes), and other electronically readable media such as flash storage devices and memory devices (e.g., RAM, ROM). The computer-readable medium may be local to the computer executing the instructions, or may be remote to this computer such as when coupled to the computer via a computer network. The processors 116 may be included in a general-purpose or specific-purpose computer that becomes the captive portal server 102 as a result of executing the instructions. In another example, rather than being software modules executed by one or more processors 116, the modules 118, 120, 122, 124, 126 may be implemented as hardware modules configured to perform the above-described functions. Functions of single modules may be separated into multiple units, or the functions of multiple modules may be combined into a single unit. For example, the gateway 120, DHCP server 122, DNS server 124, and/or internal web server 126 may be located external to the captive portal server 102, either on the hotel LAN 104 or elsewhere on the Internet 106. Unless otherwise specified, features described may be implemented in hardware or software according to different design requirements. In addition to a dedicated physical computing device, the word "server" may also mean a service daemon on a single computer, virtual computer, or shared physical computer or computers, for example. Additionally, all combinations and permutations of the above described features and configurations may be utilized in conjunction with the invention.

What is claimed is:

1. A method of providing a captive portal, the method comprising:
   receiving a first transmission control protocol (TCP) connection request from a client device, the first TCP connection request having a target address of a first web server;
   determining whether the client device is authorized to directly access the first web server;
   when the client device is authorized to directly access the first web server, passing the first TCP connection request to the first web server; and
   when the client device is not authorized to directly access the first web server:
      accepting the first TCP connection request and establishing a connection with the client device by pretending to be the first web server;
      receiving from the client device via the connection a hypertext transfer protocol (HTTP) request for a requested web page on the first web server;
      retrieving original content of a designated web page from a second web server; wherein the designated web page is different than the requested web page, the second web server is different than the first web server, and the second web server is a web server that the client device is authorized to directly access;
      modifying the original content of the designated web page as retrieved to form modified content having at least some of the original content of the designated web page preserved; wherein the modified content is formed such that a link in the original content that is a relative link without any specified base domain now has in the modified content a specified base domain pointing to the second web server; and
      replying to the client device via the connection with an HTTP response including the modified content; whereby a web browser on the client device displays the designated web page according to the modified content as if it were the requested web page provided by the first web server.

2. The method of claim 1, wherein modifying the original content of the designated web page as retrieved comprises replacing the relative link in the original content of the designated web page with a corresponding absolute link in the modified content, the absolute link differing from the relative link only by specifying the base domain of the second web server.

3. The method of claim 1, wherein modifying the original content of the designated web page as retrieved comprises adding to the modified content of the designated web page one or more link base designators specifying the base domain of the second web server.

4. The method of claim 1, further comprising, even when the web browser on the client device attempts to keep the connection open, causing the connection with the client device to be closed after replying to the client device with the HTTP response and before a subsequent HTTP request is received from the client device over the connection.

5. The method of claim 1, wherein the designated web page is a predetermined first page of a login portal.

6. The method of claim 5, further comprising, after the client device has successfully logged in at the login portal, determining the client device to be authorized to directly access the first web server when receiving from the client device a subsequent TCP connection request for the first web server.

7. The method of claim 1, further comprising preventing the client device from caching the modified content of the designated web page as the requested web page.

8. The method of claim 7, wherein preventing the client device from caching the modified content of the designated web page as the requested web page comprises including a cache-control header in the HTTP response.

9. The method of claim 7, wherein preventing the client device from caching the modified content of the designated web page as the requested web page comprises adding a hypertext markup language (HTML) no-cache meta tag to the modified content.

10. A tangible non-transitory computer-readable medium comprising computer executable instructions that when executed by a computer cause the computer to perform the method of claim 1.

11. The method of claim 1, further comprising:
    receiving a second TCP connection request from the client device, the second TCP connection request having a target address of the second web server as a result of the web browser on the client device following the link in the modified content to the specified base domain;
    determining that the client device is authorized to directly access the second web server; and
    passing the second TCP connection request to the second web server; whereby the client device is enabled to establish a TCP connection with the second web server and send a subsequent HTTP request for link-specified content directly to the second web server.

12. A captive portal server controlling network communications between a first network and a second network, the captive portal server comprising:
    a first network interface coupled to the first network;
    a second network interface coupled to the second network; and
    one or more processors coupled to the first and second network interfaces and configured to:
       receive a first transmission control protocol (TCP) connection request from a client device on the first network, the first TCP connection request having a target address of a first web server on the second network;
       determine whether the client device is authorized to directly access the first web server;
       when the client device is authorized to directly access the first web server, pass the first TCP connection request to the first web server on the second network; and
       when the client device is not authorized to directly access the first web server:
          accept the first TCP connection request and establish a connection with the client device by pretending to be the first web server;

receive from the client device via the connection a hypertext transfer protocol (HTTP) request for a requested web page on the first web server;

retrieve original content of a designated web page from a second web server; wherein the designated web page is different than the requested web page, the second web server is different than the first web server, and the second web server is a web server that the client device is authorized to directly access;

modify the original content of the designated web page as retrieved to form modified content having at least some of the original content of the designated web page preserved; wherein the modified content is formed such that a link in the original content that is a relative link without any specified base domain now has in the modified content a specified base domain pointing to the second web server; and reply to the client device via the connection with an HTTP response including the modified content; whereby a web browser on the client device displays the designated web page according to the modified content as if it were the requested web page provided by the first web server.

13. The captive portal server of claim 12, wherein the one or more processors are further configured to provide functionality of the second web server internal to the captive portal server.

14. The captive portal server of claim 12, wherein the second web server is a local web server coupled to the first network.

15. The captive portal server of claim 12, wherein the second web server is an external web server coupled to the second network.

16. The captive portal server of claim 12, wherein the one or more processors are further configured to:

receive a second TCP connection request from the client device, the second TCP connection request having a target address of the second web server as a result of the web browser on the client device following the link in the modified content to the specified base domain;

determine that the client device is authorized to directly access the second web server; and pass the second TCP connection request to the second web server; whereby the client device is enabled to establish a TCP connection with the second web server and send a subsequent HTTP request for link-specified content directly to the second web server.

17. The captive portal server of claim 12, wherein the one or more processors are configured to modify the original content of the designated web page as retrieved by replacing the relative link in the original content of the designated web page with a corresponding absolute link in the modified content, the absolute link differing from the relative link only by specifying the base domain of the second web server.

18. The captive portal server of claim 12, wherein the one or more processors are configured to modify the original content of the designated web page as retrieved by adding to the modified content of the designated web page one or more link base designators specifying a base domain of the second web server.

19. The captive portal server of claim 12, wherein the designated web page is a predetermined first page of a login portal.

20. A system comprising:

a captive portal server coupled to both a local area network and an external network; and a dynamic host configuration protocol (DHCP) server coupled to the local area network and configured to cause client devices newly connected to the local area network to utilize the captive portal server as a default gateway;

wherein the captive portal server is configured to:

receive a first transmission control protocol (TCP) connection request from a client device on the local area network, the first TCP connection request having a target address of a first web server on the external network;

determine whether the client device is authorized to directly access the first web server;

when the client device is authorized to directly access the first web server, pass the first TCP connection request to the first web server on the external network; and when the client device is not authorized to directly access the first web server:

accept the first TCP connection request and establish a connection with the client device by pretending to be the first web server;

receive from the client device via the connection a hypertext transfer protocol (HTTP) request for a requested web page on the first web server;

retrieve original content of a designated web page from a second web server; wherein the designated web page is different than the requested web page, the second web server is different than the first web server, and the second web server is a web server that the client device is authorized to directly access;

modify the original content of the designated web page as retrieved to form modified content having at least some of the original content of the designated web page preserved; wherein the modified content is formed such that a link in the original content that is a relative link without any specified base domain now has in the modified content a specified base domain pointing to the second web server; and reply to the client device via the connection with an HTTP response including the modified content; whereby a web browser on the client device displays the designated web page according to the modified content as if it were the requested web page provided by the first web server.

* * * * *